Oct. 31, 1939.    J. T. LOGAN    2,177,900
POWER SYSTEM PROTECTION
Original Filed Sept. 8, 1936
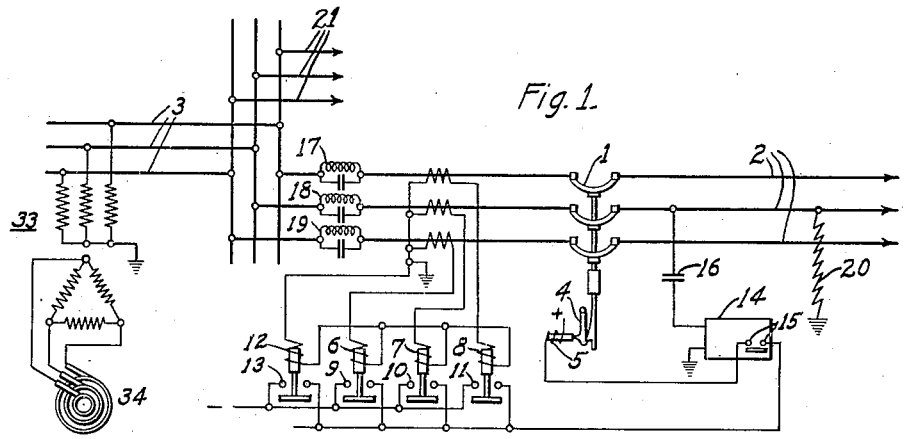
WITNESSES:
Leon M. Garman
Nw. C. Groome
INVENTOR
James T. Logan.
BY
G. O. Harrison
ATTORNEY Patented Oct. 31, 1939

2,177,900

UNITED STATES PATENT OFFICE 2,177,900

POWER SYSTEM PROTECTION

James T. Logan, Atlanta, Ga.

Substitute for application Serial No. 99,692, September 8, 1936. This application October 9, 1937, Serial No. 168,212

13 Claims. (Cl. 175—294)

The present application is a substitute for my prior application, Serial No. 99,692, filed September 8, 1936, entitled Electric power system relay protection. Similarly to my prior application, the present application relates to the protection of electric systems of transmission and distribution by means of apparatus which will respond to an abnormal high-frequency condition caused by a short-circuit or ground.

Although my invention is of general utility in the protective art, it is, in certain aspects, particularly applicable to transmission line protection, in which relay operation within time intervals of the order of 1 to 3 cycles is desirable in order to clear faults before the phase angle difference of alternating voltages in different parts of the system exceeds the stability limits of the system. In other aspects, the invention is particularly applicable to the detection of faults on circuits of relatively high impedance, such as rural distribution lines, on which the usual protective devices such as fuses and overcurrent relays, cannot be relied upon to distinguish between short-circuits and normal loads. However, the field of application of my invention will become more apparent from a detailed consideration of the conditions arising during a short-circuit on a power line.

In the usual alternating-current power system, the wave form of voltage and current during normal conditions, is approximately sinusoidal, some distortion being present because of such effects as magnetic saturation in the iron-cored power apparatus of the system and irregularities of generated wave form. The harmonics produced by these effects are usually of the order of the third to the twenty-fifth, those of lower order usually being of larger magnitude unless the higher harmonics are intensified by capacitance effects. Within the usual limits of line constants, the maximum frequency of harmonics of appreciable magnitude is of the order of 1500 to 2000 cycles per second or less.

When a fault occurs on the power line, however, the wave form of voltage and current becomes extremely irregular, and energy may be segregated at much higher frequencies such as 10, 20, 30 and 40 kilocycles. The mere presence of energy at such frequencies on the line, however, is not an infallible indication of a fault, as somewhat similar disturbances arise during normal conditions of the line. Examples of such disturbances are steep wave fronts arising from switching operations, high-frequency discharges of short duration resulting from the operation of lightning arresters and protective gaps, as well as induced lightning strokes.

It is an object of my invention to provide a novel protective device for electrical systems of transmission and distribution which will respond to the high-frequency energy produced by a fault arc, but which will not operate in response to the disturbances caused by switching operations, the discharges of lightning arresters and protective gaps, or in response to induced lightning discharges.

In accordance with my invention, I provide an electronic device of the type in which a control element, such as a grid, operates to modify the conductive condition of a discharge path in response to a predetermined impressed electrical condition, and in which the control element maintains or at least regains periodically, control of the discharge path throughout the duration of the impressed condition. By the use of such a discharge device, energized in accordance with a segregated high-frequency condition resulting from an arc on the protected circuit, a change of magnitude of the discharge current may be maintained for the duration of the segregated high-frequency condition and interrupted as soon as the high-frequency condition ceases to exist.

By the use of a timing device, controlled at all times by the electronic device mentioned above, relay operation is delayed for a small but definite interval of time sufficient to prevent circuit breaker tripping in response to steep wave fronts and other disturbances of short duration. This time interval, which may be as small as one or two cycles in transmission line applications, is preferably so limited as to prevent voltage phase angle shifts approaching the stability limits of the particular system to which the invention is applied. In distribution applications, of course, the time delay may be prolonged considerably without disadvantages.

It will be apparent that the principle of my invention, as outlined above, may be carried out by a number of different forms of electronic devices and circuits, and I do not, accordingly, intend by the description of a single embodiment, to limit the invention to the specific apparatus disclosed. In the embodiment to be described in detail, I have disclosed a high-vacuum voltage amplifier of the pentode type which serves as the electronic device responsive to the high-frequency electrical condition resulting from the fault arc, and I preferably utilize a triode detector and an energy storage device controlled thereby, such as a capacitor, as the timing device under continuous control of the voltage amplifier. As indicated above, however, there are numerous equivalents of these specific elements which may be used in carrying out the principle of the invention.

My invention may better be understood by reference to the accompanying drawing, in which:

Figure 1 is a diagrammatic view showing an application of the invention to one terminal of a three-phase transmission line.

Fig. 2 is a diagrammatic view showing a preferred form of the electronic relay of Fig. 1.

Fig. 3 is a diagram in Cartesian coordinates showing the relationship of impedance and frequency of the parallel-resonant circuits of Fig. 1.

Fig. 4 is a diagrammatic view showing an application of my invention to the protection of rural distribution lines.

Fig. 5 is a diagrammatic view showing a cycle of alternating current or voltage of commercially acceptable wave form; and, Fig. 6 is a diagrammatic view showing a cycle of alternating current or voltage having superimposed thereon the irregularities caused by the presence of an arcing ground on the circuit.

Referring to Figure 1 in detail, a circuit breaker 1 is provided for controlling the connection of an alternating current power circuit, such as a polyphase transmission line 2, to a polyphase supply bus 3. The supply bus 3 is energized by means of a power transformer 33 from a suitable polyphase source such as a polyphase generator 34. Although only one terminal of the transmission line 2 is shown in Fig. 1, it will be understood that the system may comprise a plurality of lines connected radially, or interconnected to form a transmission network.

The circuit breaker 1 may be of any suitable latched-in type known in the art, and is shown diagrammatically as having a latch 4 for maintaining the circuit breaker contacts in circuit-closing position, and having a trip coil 5, effective when energized, to trip the latch 4.

An individual phase relay 6, 7 or 8 is provided for each phase of the transmission line 2 for controlling the circuit breaker 1. Each of the phase relays 6, 7 and 8 is responsive to any suitable power frequency condition, such as overcurrent, impedance or reactance, indicative of a fault on the corresponding phase of the transmission line 2. A ground relay 12, which is responsive to any suitable power-frequency condition indicative of a ground fault on the transmission line 2, and a high-frequency relay 14 (to be hereinafter more fully described) which responds to a predetermined high-frequency electrical condition resulting from an arc on the transmission line 2, are also provided as part of the relay equipment for the circuit breaker 1.

The trip coil 5 of the circuit breaker 1 is connected, in a suitable energizing circuit, in series with contacts 15 of the high-frequency relay and in series with a number of parallel branch circuits, each of which includes the contacts 9, 10, 11 or 13 of the phase relays 6, 7, and 8 and the ground relay 12, respectively.

The phase relays 6, 7 and 8 and the ground relay 12 are provided for aiding the arc frequency relay 14, during fault conditions, in distinguishing whether the fault exists on the protected transmission circuit 2 or on some other circuit of the transmission system. As shown, the relays 6, 7, 8 and 12 are of simple over-current type, as would be applicable particularly to the protection of a radial transmission circuit, but it will be understood that if the protected circuit 2 is interconected at its far end with other transmission circuits of the network, the phase relays 6, 7, 8 and the ground relay 12 may be of other forms more appropriate to the application.

Suitable coupling means, such as a coupling capacitor 16, is provided for energizing the high-frequency relay 14 in accordance with a high-frequency electrical condition resulting from an arc on the protected circuit 2, and, in addition thereto, a number of line elements for impeding the flow of high-frequency currents to which the arc frequency relay 14 is tuned, such as parallel resonant circuits 17, 18 and 19, may be included in the phase conductors of the transmission circuit 2. The impedance elements 17, 18 and 19 also serve to prevent operation of the high-frequency relay 14 in response to arc frequency currents which may arise on other circuits of the system such as the circuit 21.

Referring to Fig. 2, the high-frequency relay 14 comprises suitable electronic apparatus including a discharge device 38 having principle electrodes 39 and 39a and having a control element 40 for controlling the discharge path between the principal electrodes 39 and 39a. The discharge device 38 and its associated energizing circuit may be of any suitable type such that a periodic condition of energization (for example, the high-frequency electrical condition derived from the circuit 2) applied to the control element 40 will produce a predetermined electrical effect in the discharge path between the principal electrodes 39 and 39a, and that interruption of the periodic condition of energization will cause interruption of the predetermined electrical effect. Preferably, the discharge device 38 is of such type that the control element 40 continuously controls the magnitude of discharge current between the principal electrodes 39 and 39a. This condition is fulfilled in any controlled discharge device in which the gas pressure is insufficient to establish a self-sustaining discharge during normal operation of the tube.

As a concrete example of the form of discharge device with which the invention may be practiced, it will be assumed that the device 38 is a hard or highly exhausted pentode having a cathode 39, heated by suitable apparatus (not shown), and having an anode 39a and a control element 40, in the nature of an electrostatic control grid. With such a discharge device 38, operated under proper conditions as an electronic amplifier, energization of the control grid 40 at high frequency will produce a predetermined electrical effect, in the form of an alternating component of anode current, in the discharge path between the principal electrodes 39 and 39a.

In addition to the control grid 40, the pentode 38 is provided with a screen grid 41 for reducing the effect of interelectrode capacitance between the cathode 39 and the anode 39a, to thereby reduce or eliminate the effect of feed-back from the output circuit to the input circuit of the pentode 38. A suppressor grid 43 is also provided in the pentode 38, for reducing secondary emission from the anode 39a.

As mentioned above, an electro-responsive timing device, under continuous control of the discharge device 38, is provided for delaying relay operation, in response to arc frequency currents, for a sufficient length of time to distinguish faults from minor transient disturbances. In order to avoid the inertia effects inherent in electromagnetic timing devices, I preferably utilize an electronic timing device consisting of a triode detector 50, and an energy storage device such as a capacitor 56 connected to be charged in accordance with the direct-current component of anode current of the triode detector 50.

The electro-responsive timing device, comprising the triode detector 50 and the capacitor 56, is connected to the discharge device 38 in such manner as to be effective upon the occurrence of a predetermined electrical effect, such as the presence of arc frequency current in the cathode-anode path of the device 38, to initiate a timing cycle, and effective upon interruption of the predetermined electrical effect to terminate the timing cycle. In this operation, the timing cycle consists of the progressive accumulation of charge by the capacitor 56 to a sufficient value to effect relay operation.

The triode detector 50 is preferably of the hard or highly evacuated type, having a heated cathode 51, a control grid 52 and an anode 53. The anode 53 is connected, in series with parallel circuits which include the energizing coil 55 of a telephone relay 54 and the capacitor 56, respectively, to the anode source terminal +B.

A filter, comprising a pair of tuning capacitors 35 and 37 and an inductive coupling device 36, is provided for segregating a relatively narrow band of frequencies arising from an arc on the protected circuit 2 and passed by the coupling capacitor 16, and for supplying the segregated frequencies to the input circuit of the pentode 38. The inductive coupling device 36 is preferably designed to provide loose coupling between the tuned circuit comprising the tuning capacitor 35 and one winding of the device 36, and the tuned circuit comprising the capacitor 37 and the remaining winding of the device 36. The two tuned circuits so constituted are designed or adjusted to pass high frequency conditions within approximately the same band of frequencies, for example, a band in the region of 30 kilocycles, although it will be obvious that the invention may be practiced with frequencies in an entirely different range.

The control grid 40 is connected to ground in series with the filter comprising the elements 35, 36 and 37, to respond to high frequency conditions segregated by the filter.

The cathode 39 and suppressor grid 43 are preferably connected together and to ground through an adjustable biasing resistor 44, which serves to provide a direct-current voltage on the cathode 39, dependent upon the discharge current passed by the latter, thereby effectively providing a negative bias voltage for the control grid 40.

The various circuits of the discharge device 38 and the triode detector 50 are connected to a suitable source of direct-current voltage, (not shown) provided with terminals indicated by the reference characters +B, —B, +C and —C. It will be understood that these characters refer to the positive and negative terminals of the B and C voltage sources, the voltages of these terminals being indicated by legend below the terminal designation.

The screen grid 41 is preferably maintained at a suitable voltage, between that of the cathode 39 and the anode 39a, by any suitable means, such as a screen resistor 42a. The screen resistor 42a serves to reduce the voltage of the screen grid 41 as compared to the +B or anode voltage, by an amount dependent upon the flow of screen grid current through the resistor 42a. A screen capacitor 42 is connected between the screen grid 41 and ground, in order to increase the effectiveness of the screen grid 41 as an electrostatic shield between the control grid 40 and the anode 39a.

A by-pass capacitor 45 is connected in parallel to the adjustable biasing resistor 44, for the purpose of providing a low impedance path for high-frequency currents around the latter resistor.

A filter comprising tuning capacitors 46 and 48 and the inductive coupling device 47 is connected to the output circuit of the pentode 38 in order to eliminate stray frequencies which may appear in the output of the latter tube. The output circuit of the latter filter is connected to the input circuit of the triode detector 50. An insulating capacitor 49 is preferably connected between the cathode 51 and control grid 52 of the triode detector 50 for insulating the control grid 52 and thereby allowing the latter to be operated with a negative bias.

The control grid 52 is connected to a suitable source of negative bias voltage, indicated at C, of such value that the discharge current between the cathode 51 and the anode 53 is normally blocked, but a discharge current flows during part of the cycle when an alternating voltage is impressed upon the control grid 52. It will seen that this arrangement provides for passage of discharge current through the detector 50 when the arc frequency current is present in the output of the discharge device 38, whereas if the triode detector 50 were operated without grid bias by means of a capacitor and grid leak in its input circuit, a decrease of discharge current through the triode 50 would result under similar conditions.

The operation of the apparatus shown in Figs. 1 and 2 may be set forth as follows: Assuming the generator 34 to be in operation and the circuit breaker 1 to be in closed position, as shown, power is supplied from the generator 34 through the power transformer 33 and bus 3 to various loads supplied from the transmission circuits of the system, such as the transmission circuits 2 and 21. As long as the transmission circuits 2 and 21 remain in unfaulted condition, the contacts 9, 10, 11, 13 and 15 of the protective relays all remain open, as shown, and the circuit breaker 1 remains closed.

If a fault occurs on the transmission line 2, as indicated at 20, one or more of the phase relays 6, 7 or 8 or the ground relay 12, operates to closed position, and at the expiration of its time delay, operation of the high frequency relay 14 is brought about in the following manner.

Upon the occurrence of the fault on the circuit 2, arc energy in a wide range of frequencies passes the coupling capacitor 16, and a relatively narrow band of frequencies is selected by the filter 35, 36, 37 (Fig. 2) and impressed upon the control grid 40 of the pentode 38. In response to this selected band of frequencies, amplified current flow of the same frequency is produced in the filter comprising the elements 46, 47 and 48, and the amplified and filtered output of the pentode 38 is supplied to the input circuit of the triode detector 50.

Upon energization with the selected arc frequency voltage, as amplified by the pentode 38, the triode detector 50 passes a direct-current component which charges the capacitor 56, and the voltage across the latter increases at a timed rate. When the voltage on the capacitor 56 reaches a value sufficient to effect operation of the telephone relay 54, the latter operates to closed position, thereby completing a circuit for the trip coil 5. In response to energization of the trip coil 5, the circuit breaker 1 opens to disconnect the faulted line 2.

Fig. 4 illustrates an important application of the invention to rural distribution lines. With the protectve apparatus at present available for use on such lines, it is often impossible to detect a fault, as the magnitude of fault current may be relatively small as compared with the magnitude of normal load currents. It frequently happens, therefore, that faults on such circuits are not detected by the usual protective devices, such as overcurrent relays, and the faulted line remains energized indefinitely. It has happened that persons unfamiliar with electrical circuits, seeing a faulted conductor apparently burning on the ground, have attempted to pick up the conductor and have thereby exposed themselves to serious injury. The arrangement shown in Fig. 4 provides an effective method of detecting and clearing such faults, even though the fault current may be of relatively small magnitude as compared to normal load current of the protected circuit.

Referring to Fig. 4 in detail, a single phase source 23 is connected to a rural distribution line 26 by means of a power transformer 24. A circuit breaker 25, having a trip coil 31, is provided for opening the distribution circuit 26 in the event of a fault on the line.

A potential transformer 27 is provided for energizing the trip coil 31 and any other translating devices, such as a watthour meter 28 which may require potential energization. A current transformer 29 is provided for energizing the translating device 28, and also an arc frequency relay 14 similar to that described above in connection with Figs. 1 and 2, but preferably designed to have a much longer time delay.

The capacitance between the primary and secondary windings of the current transformer 29 is sufficient to permit operation of the arc frequency relay 14 therefrom in the same manner as from a coupling capacitor.

A customer's distribution transformer installation is shown at 32. This comprises the usual distribution transformer 58 connected for three-wire ground-to-neutral service, and having the usual protective devices indicated diagrammatically as an expulsion discharge tube 57. The operation of the apparatus shown in Fig. 4 will be obvious from that described above in connection with Figs. 1 and 2. Upon the occurrence of a fault, as indicated by the grounded conductor 30, the arc frequency relay 14 operates at the expiration of its time delay to open the circuit breaker 25, thereby clearing the fault.

I do not intend that the present invention shall be restricted to the specific structural details, arrangement of parts, or circuit connections herein set forth, as various modifications thereof may be effected without departing from the spirit and scope of my invention. I desire, therefore, that only such limitations shall be imposed as are indicated in the appended claims.

I claim as my invention:

1. In an alternating-current system of transmission and distribution, an alternating-current power circuit; a circuit breaker in said circuit; electronic apparatus comprising a discharge device and energizing means therefor, said discharge device having principal electrodes and having a control element for controlling the discharge path between said principal electrodes, said electronic apparatus being of such type that a predetermined periodic condition of energization of said control element will produce a predetermined electrical effect in said discharge path and that interruption of said periodic condition of energization will cause interruption of said predetermined electrical effect; means for energizing said control element in accordance with a high-frequency electrical condition arising from an arc on said power circuit; an electro-responsive timing device effective upon the occurrence of said predetermined electrical effect to initiate a timing cycle and effective upon interruption of said predetermined electrical effect to terminate said timing cycle, and means responsive to operation of said timing device in completing said timing cycle for causing said circuit breaker to open.

2. In an alternating-current system of transmission and distribution, an alternating-current power circuit; a circuit breaker in said circuit; an electronic device of the type having a pair of principal electrodes and having a control element effective to continuously control the magnitude of current flow between said principal electrodes; energizing means for said electronic device including means for energizing said control element in accordance with a high-frequency electrical condition arising from an arc on said power circuit; an electro-responsive timing device energizing in accordance with the current flow of said principal electrodes, said timing device being effective upon energization of said control element in accordance with said high-frequency condition to initiate a timing cycle and being effective upon interruption of said high-frequency condition to terminate said timing cycle; and means responsive to operating of said timing device in completing said timing cycle for causing said circuit breaker to open.

3. In an alternating-current system of transmission and distribution, an alternating-current power circuit; a circuit breaker in said circuit; an electronic device of the type having a pair of principal electrodes and having a control element effective to continuously control the magnitude of current flow between said principal electrodes; energizing means for said electronic device including means for energizing said control element in accordance with a high-frequency electrical condition arising from an arc on said power circuit; an energy storage device; means for controlling the energization of said storage device in accordance with an output condition of said electronic device; and means responsive to a predetermined condition of energization of said storage device for causing said circuit breaker to open.

4. In an alternating-current system of transmission and distribution, an alternating-current power circuit; a circuit breaker in said circuit; an electronic device of the type having a pair of principal electrodes and having a control element effective to continuously control the magnitude of current flow between said principal electrodes; energizing means for said electronic device including coupling and filtering means connected to said power circuit for segregating therefrom a high-frequency electrical condition arising from an arc thereon and for energizing said control element in accordance with the segregated high-frequency condition; an energy storage device; means for controlling the energization of said storage device in accordance with an output condition of said electronic device; and means responsive to a predetermined condition of energization of said storage device for causing said circuit breaker to open.

5. In an alternating-current system of transmission and distribution, an alternating-current power circuit; a circuit breaker in said circuit; an electronic device of the type having a pair of principal electrodes and having a control element effective to continuously control the magnitude of current flow between said principal electrodes; energizing means for said electronic device including means for energizing said control element in accordance with a high-frequency electrical condition arising from an arc on said power circuit; a capacitor; means for controlling the energization of said capacitor in accordance with an output condition of said electronic device; and means responsive to a predetermined voltage condition of said capacitor for causing said circuit breaker to open.

6. In an alternating-current system of transmission and distribution, an alternating-current power circuit; a circuit breaker in said circuit; electronic apparatus comprising a discharge device and energizing means therefor, said discharge device having principal electrodes and having a control element for controlling the current flow between said principal electrodes, said electronic apparatus being of such type that a predetermined periodic condition of energization of said control element will cause a periodic component of discharge current to flow between said principal electrodes, and that interruption of said periodic condition of energization will cause interruption of said periodic component of discharge current; means for energizing said control element in accordance with a high-frequency electrical condition arising from an arc on said power circuit; an energy storage device; means for controlling the energization of said storage device in accordance with said periodic component of discharge current; and means responsive to a predetermined condition of energization of said storage device for causing said circuit breaker to open.

7. In an alternating-current system of transmission and distribution, an alternating-current power circuit; a circuit breaker in said circuit; an electronic device of the highly-exhausted type having a hot cathode, an anode and a control grid; energizing means for said electronic device including means for energizing said control grid in accordance with a high frequency electrical condition arising from an arc on said power circuit; an energy storage device; means for controlling the energization of said storage device in accordance with an output condition of said electronic device; and means responsive to a predetermined condition of energization of said storage device for causing said circuit breaker to open.

8. In an alternating-current system of transmission and distribution, an alternating-current power circuit; a circuit breaker in said power circuit; an electronic amplifier having an input circuit and an output circuit; energizing means for said amplifier including a coupling element energized from said power circuit and including a filter connecting said coupling element and said input circuit, said filter being designed to pass alternating electrical conditions within a predetermined band of high frequencies arising from an arc on said power circuit; a second filter included in said output circuit, said second filter being designed to select alternating electrical components of the output of said electronic device within said predetermined band of high frequencies; a detector responsive to the output of said second filter; and means responsive to a predetermined output condition of said detector for causing said circuit breaker to open.

9. In an alternating-current system of transmission and distribution, an alternating-current power circuit; a circuit breaker in said power circuit; an electronic device of the highly-exhausted type having a hot cathode, an anode and a control grid; energizing means for said electronic device including a coupling element energized from said power circuit and including a filter connecting said coupling element and said control grid, said filter being designed to pass alternating electrical conditions within a predetermined band of high frequencies arising from an arc on said power circuit; a second filter included in the anode circuit of said electronic device, said second filter being designed to select alternating electrical components of the output of said electronic device within said predetermined band of high frequencies; a detector responsive to the output of said second filter; and means responsive to a predetermined output condition of said detector for causing said circuit breaker to open.

10. In an alternating-current system of transmission and distribution, an alternating-current power circuit; a circuit breaker in said power circuit; an electronic device of the highly-exhausted type having a hot cathode, an anode and a control grid; energizing means for said electronic device including a coupling element energized from said power circuit and including a filter connecting said coupling element and said control grid, said filter being designed to pass alternating electrical conditions within a predetermined band of high frequencies arising from an arc on said power circuit; a second filter included in the anode circuit of said electronic device, said second filter being designed to select alternating electrical components of the output of said electronic device within said predetermined band of high frequencies; a detector responsive to the output of said second filter; a capacitor connected to said detector to be charged in accordance with the direct-current output thereof; and means responsive to a predetermined voltage on said capacitor for causing said circuit breaker to open.

11. In an alternating-current system of transmission and distribution, a polyphase power circuit; a circuit breaker in said circuit; an individual phase relay for each phase of said power circuit, each of said phase relays being responsive to a predetermined power-frequency condition indicative of a fault on the corresponding phase of said power circuit; a high-frequency relay responsive to a predetermined high-frequency electrical condition arising directly from a fault arc on said power circuit; and means responsive to operation of said high-frequency relay and one of said phase relays for causing said circuit breaker to open.

12. In an alternating-current system of transmission and distribution, a polyphase grounded-neutral source of alternating voltage; a polyphase power circuit; a circuit breaker for controlling the connection of said power circuit to said source; ground relay means responsive to a predetermined power-frequency condition indicative of a ground fault on said power circuit; a high-frequency relay responsive to a predetermined high-frequency condition arising directly from a fault arc on said power circuit; and means responsive to operation of said ground relay means and said high-frequency relay for causing said circuit breaker to open.

13. In an alternating-current system of transmission and distribution, a polyphase grounded-neutral source of alternating voltage; a polyphase power circuit; a circuit breaker for controlling the connection of said power circuit to said source; an individual phase relay for each phase of said power circuit, each of said phase relays being responsive to a predetermined power-frequency condition indicative of a fault on the corresponding phase of said power circuit; a ground relay responsive to a predetermined power-frequency condition indicative of a ground fault on said power circuit; a high-frequency relay responsive to a predetermined high-frequency condition arising directly from a fault arc on said power circuit; and means responsive to operation of said high-frequency relay and one of the relays of the group comprising said phase relays and said ground relay for causing said circuit breaker to open.

JAMES T. LOGAN.